US008372299B2

(12) United States Patent
Nakajima et al.

(10) Patent No.: US 8,372,299 B2
(45) Date of Patent: Feb. 12, 2013

(54) SUBSTRATE TREATING APPARATUS AND SUBSTRATE TREATING METHOD

(75) Inventors: Yasunori Nakajima, Kyoto (JP); Yusuke Mori, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 779 days.

(21) Appl. No.: 12/411,266

(22) Filed: Mar. 25, 2009

(65) Prior Publication Data

US 2009/0246968 A1 Oct. 1, 2009

(30) Foreign Application Priority Data

Mar. 25, 2008 (JP) ................................ 2008-078437
Dec. 10, 2008 (JP) ................................ 2008-314742

(51) Int. Cl.
*C03C 15/00* (2006.01)

(52) U.S. Cl. .............. 216/93; 216/83; 216/96; 438/745; 438/756; 438/757

(58) Field of Classification Search ............. 156/345.11, 156/345.15, 345.16, 345.18
See application file for complete search history.

(56) References Cited

U.S. PATENT DOCUMENTS

| | | | | |
|---|---|---|---|---|
| 6,399,517 | B2 | 6/2002 | Yokomizo et al. | |
| 6,780,277 | B2 * | 8/2004 | Yokomizo et al. | 156/345.11 |
| 7,097,784 | B2 | 8/2006 | Ogawa et al. | |
| 2006/0042756 | A1 | 3/2006 | Miyazaki et al. | |
| 2007/0134822 | A1 | 6/2007 | Yamamoto et al. | |

FOREIGN PATENT DOCUMENTS

| | | |
|---|---|---|
| JP | 2001-23952 | 1/2001 |
| JP | 2007-150352 | 6/2007 |
| KR | 10-2007-0040296 | 4/2007 |

OTHER PUBLICATIONS

Notice of Allowance dated May 9, 2011 in connection with corresponding Korean Patent Application No. 10-2009-0019646. (JP2001-23952 was previously cited in an IDS filed Jun. 17, 2009 and is therefore not enclosed.).
Each item of information contained in this Information Disclosure Statement was first cited in a communication from a foreign patent office in a counterpart application and this communication was not received by any individual designated in section 1.56(c) more than thirty days prior to the filing of this Information Disclosure Statement.

* cited by examiner

*Primary Examiner* — Lan Vinh
*Assistant Examiner* — Jiong-Ping Lu
(74) *Attorney, Agent, or Firm* — Ostrolenk Faber LLP

(57) ABSTRACT

A method and apparatus for performing treatment of substrates with a treating liquid. A first storage unit stores an initial life count specifying an allowable number of treatments of substrates to be carried out with treating liquid after an entire liquid replacement with a new supply of the treating liquid; a second storage device stores a normal life count specifying an allowable number of treatments to be carried out with the treating liquid after reaching the initial life count and after a partial liquid replacement; and a control device repeats treatment of the substrates after the entire liquid replacement until the initial life count is reached; and after the initial life count has been reached and the partial liquid replacement has been made, repeats treatment of the substrates until the normal life count is reached, and makes the partial liquid replacement each succeeding time the normal life count is reached.

4 Claims, 3 Drawing Sheets

SUBSTRATE TREATING APPARATUS AND SUBSTRATE TREATING METHOD

BACKGROUND OF THE INVENTION (1) Field of the Invention

This invention relates to a substrate treating apparatus and method for performing a predetermined treatment such as etching or cleaning of semiconductor wafers, glass substrates for liquid crystal displays and so on (hereinafter referred to simply as substrates). More particularly, the invention relates to a technique for performing treatment while changing liquids.

(2) Description of the Related Art

Conventionally, this type of apparatus includes a treating tank for storing a treating liquid and immersing substrates therein, a treating liquid supply unit for supplying the treating liquid to the treating tank, and a treating liquid discharge unit for discharging the treating liquid from the treating tank (see Japanese Unexamined Patent Publication No. 2001-23952, for example).

Where, for instance, substrates are made of silicon, silicon concentration in the treating liquid increases with progress of treatment of the substrates with the treating liquid, which gradually lowers a treatment rate. Thus, a "partial liquid replacement" is carried out at a time when a certain number of substrates have been treated, to discharge part of the treating liquid from the treating liquid discharge unit and supply the treating liquid in an amount corresponding to the discharged treating liquid. This partial liquid replacement allows the lowered treatment rate to remain within a certain target range. In this case, a parameter called "life count" set in advance is used to indicate the certain number of substrates. The number (or the number of lots) of treated substrates is counted and, when the count reaches the life count, a partial liquid replacement is carried out.

The conventional apparatus with the above construction, however, has the following problem.

A first treating liquid not having treated substrates and a treating liquid having treated a certain number of substrates are controlled with a common parameter or the life count. In addition, an initial treatment rate is higher than a treatment rate after a partial liquid replacement. As a result, the first treating liquid may be partially replaced before the treatment rate lowers to a certain target range, and thus treatment will be continued without the treatment rate reaching the target range even with a subsequent partial liquid replacement, which may cause a problem that an unsuitable treatment of the substrates is performed.

SUMMARY OF THE INVENTION

This invention has been made having regard to the state of the art noted above, and its object is to provide a substrate treating apparatus and a substrate treating method capable of performing suitable treatment of the substrates by selectively using a life count.

The above object is fulfilled, according to this invention, by a substrate treating apparatus for performing treatment of substrates with a treating liquid, the apparatus comprising a treating tank for storing the treating liquid and performing a predetermined treatment of the substrates; a treating liquid supply device for supplying the treating liquid to the treating tank; a treating liquid discharge device for discharging the treating liquid from the treating tank; a first storage device for storing in advance an initial life count specifying an allowable number of treatments of the substrates to be carried out with the treating liquid after an entire liquid replacement which replenishes the treating tank with a new supply of the treating liquid from the treating liquid supply device; a second storage device for storing in advance a normal life count specifying an allowable number of treatments to be carried out with the treating liquid after reaching the initial life count and after a partial liquid replacement which discharges part of the treating liquid in a predetermined amount from the treating tank through the treating liquid discharge device and replenishes, from the treating liquid supply device, a new supply of the treating liquid in an amount corresponding to the predetermined amount; and a control device for performing treatment of the substrates until the initial life count is reached after the entire liquid replacement, and after the initial life count is reached and the partial liquid replacement is made, performing treatment of the substrates while making the partial liquid replacement each time the normal life count is reached.

According to the invention, the control device, in controlling treatment of the substrates, first performs an entire liquid replacement by discharging all the treating liquid from the treating liquid discharge device and replenishing the treating tank with a new supply of the treating liquid from the treating liquid supply device, and subsequently performs a partial liquid replacement upon reaching the initial life count. The control device thereafter performs a partial liquid replacement each time the normal life count is reached. In the invention, the selective use of the initial life count and normal life account allows the treatment of the substrates to be carried out according to the state of the treating liquid, which can realize a proper treatment of the substrates.

In this invention, the initial life count may be set larger than the normal life count.

A treatment rate becomes higher after an entire liquid replacement, and thus a partial liquid replacement is made at the larger initial life count, i.e. after treatment of many substrates. In contrast to this, a treatment rate becomes lower after the partial liquid replacement. And thus, the partial liquid replacement is made at the normal life count smaller than the initial life count, i.e. after treatment of a normal number of substrates. With such treatment, the treatment rate can stabilize within a range of target treatment rates.

In this invention, the initial life count may be a number of treatments of the substrates falling within a range of target treatment rates.

The number of substrates to be treated that will cause the treatment rate to be within the target treatment rates may be determined by experiment in advance, and the number thereof may be set as the initial life count. Then, the treatment rate may be maintained within the target treatment rates after each partial liquid replacement.

Furthermore, this invention may include a setting device configured to set the initial life count to the first storage device and the normal life count to the second storage device.

The degree of lowering of the treatment rate is variable with treatment conditions of the treating liquid or the type and surface condition of the substrates. With this setting device, the life counts can be properly set according to these conditions.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

A preferred embodiment of this invention will be described in detail hereinafter with reference to the drawings.

Figure 1:
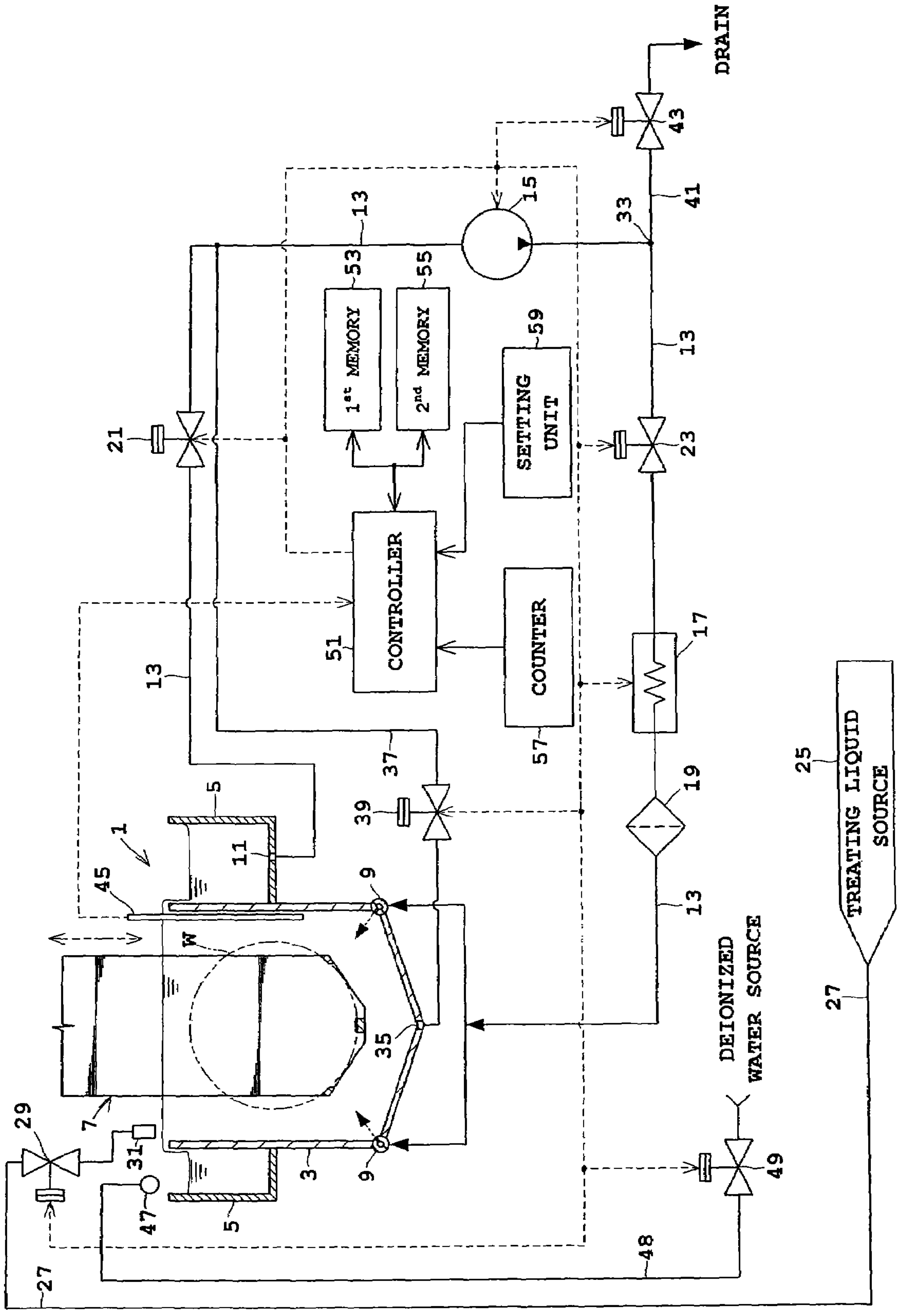
FIG. 1 is a schematic view of a substrate treating apparatus according to one embodiment.

FIG. 1 is a schematic view of a substrate treating apparatus according to one embodiment. In the following description, the treating liquid will be exemplified by a phosphoric acid solution containing phosphoric acid ($H_3PO_4$) and deionized water.

The substrate treating apparatus includes a treating tank 1 having an inner tank 3 and an outer tank 5 for collecting the phosphoric acid solution overflowing the inner tank 3. The inner tank 3 has a holding arm 7 for moving substrates or wafers W vertically between a treating position inside the inner tank 3 and a standby position above the inner tank 3. The holding arm 7 contacts and supports a plurality of wafers W in upstanding posture.

The inner tank 3 has a pair of jet pipes 9 at its bottom for supplying the phosphoric acid solution into the inner tank 3. The outer tank 5 has a drain port 11 at its bottom for discharging the collected phosphoric acid solution. The jet pipes 9 are connected to the drain port 11 via a circulating piping 13. The circulating piping 13 has a pump 15, an in-line heater 17 and a filter 19 arranged in the stated order from adjacent the drain port 11. The in-line heater 17 has a function to heat the circulating phosphoric acid solution (e.g. to a range of 120-180° C.). The filter 19 has a function to remove particles and the like from the phosphoric acid solution. The circulating piping 13 has a switch valve 21 between the drain port 11 and pump 15, and a switch valve 23 between the pump 15 and in-line heater 17.

One end of a supply piping 27 is connected to a treating liquid source 25. The treating liquid source 25 stores phosphoric acid ($H_3PO_4$) at room temperature (e.g. 25° C.). The supply piping 27 has a control valve 29 for controlling flow rate. The other end of the supply piping 27 is connected to a supply unit 31 above the inner tank 3. The phosphoric acid supplied from the treating liquid source 25 flows through the supply piping 27 at a flow rate determined by the control valve 29, to be supplied into the inner tank 3 from the supply unit 31.

The supply unit 31 corresponds to the "treating liquid supply device" in this invention.

The circulating piping 13 has a junction 33 between the pump 15 and switch valve 23. A bottom drain port 35 is formed at the bottom of the inner tank 3 for use in discharging the treating liquid from the inner tank 3 quickly. A bottom drainpipe 37 is connected to the bottom drain port 35 and to a position of the circulating piping 13 upstream of the pump 15. The bottom drainpipe 37 has a switch valve 39 mounted thereon. The junction 33 has a drainpipe 41 extending therefrom for guiding to a drain system the phosphoric acid solution discharged via the bottom drain port 35 and bottom drainpipe 37. The drainpipe 41 has a switch valve 43.

The drainpipe 41 noted above corresponds to the "treating liquid discharge device" in this invention.

The inner tank 3 has a concentration meter 45 attached to extend along an inner wall thereof. The concentration meter 45 detects a specific substance of the wafers W eluted into the phosphoric acid solution. In the case of wafers W made of silicon, for example, the concentration meter 45 determines a concentration of eluted silicon in the phosphoric acid solution, and outputs a concentration signal corresponding the concentration determined.

A deionized water supply unit 47 is disposed above the outer tank 5. The deionized water supply unit 47 is connected to a supply pipe 48 which in turn is connected to a deionized water source. The supply pipe 48 has a control valve 49 for controlling flow rate.

A controller 51, corresponding to the "control device" in this invention, performs overall control of the components mentioned above. The controller 51 has a first memory 53 and a second memory 55 connected thereto. The particulars stored in these memories will be described hereinafter. The controller 51 has, connected thereto, a counter 57 that counts the number of wafers W or the number of lots to be treated in every treatment for counting the number of treatments of the wafers W. The controller 51 has, also connected thereto, a setting unit 59 operated by the operator of the apparatus. The controller 51 controls the switch valve 43, control valve 29 and so on, based on set values, described hereinafter, of the counter 57 and the first and second memories 53 and 55, to perform entire liquid replacements and partial liquid replacements described hereinafter. Further, the controller 51 controls the control valve 49 and so on, based on the concentration signal from the concentration meter 45, to perform an appropriate control to maintain the silicon concentration in the phosphoric acid solution substantially constant.

The first memory 53, corresponding to the "first storage device" in this invention, stores an initial life count ILC in advance. The initial life count ILC specifies an allowable number of treatments of wafers W to be carried out with the treating liquid after an entire liquid replacement which replenishes the treating tank 1 with a new supply of the treating liquid from the supply unit 31.

The second memory 55, corresponding to the "second storage device" in this invention, stores a normal life count NLC in advance. The normal life count NLC specifies an allowable number of treatments to be carried out with the treating liquid after reaching the initial life count ILC and after a partial liquid replacement which discharges part of the treating liquid in a predetermined amount from the treating tank through the drain pipe 41 and replenishes, from the supply unit 31, with a new supply of the treating liquid in an amount corresponding to the predetermined amount.

The operator of the apparatus, for example, sets the initial life count ILC and normal life count NLC via the setting unit 59 corresponding to the "setting device" in this invention.

Figure 2:
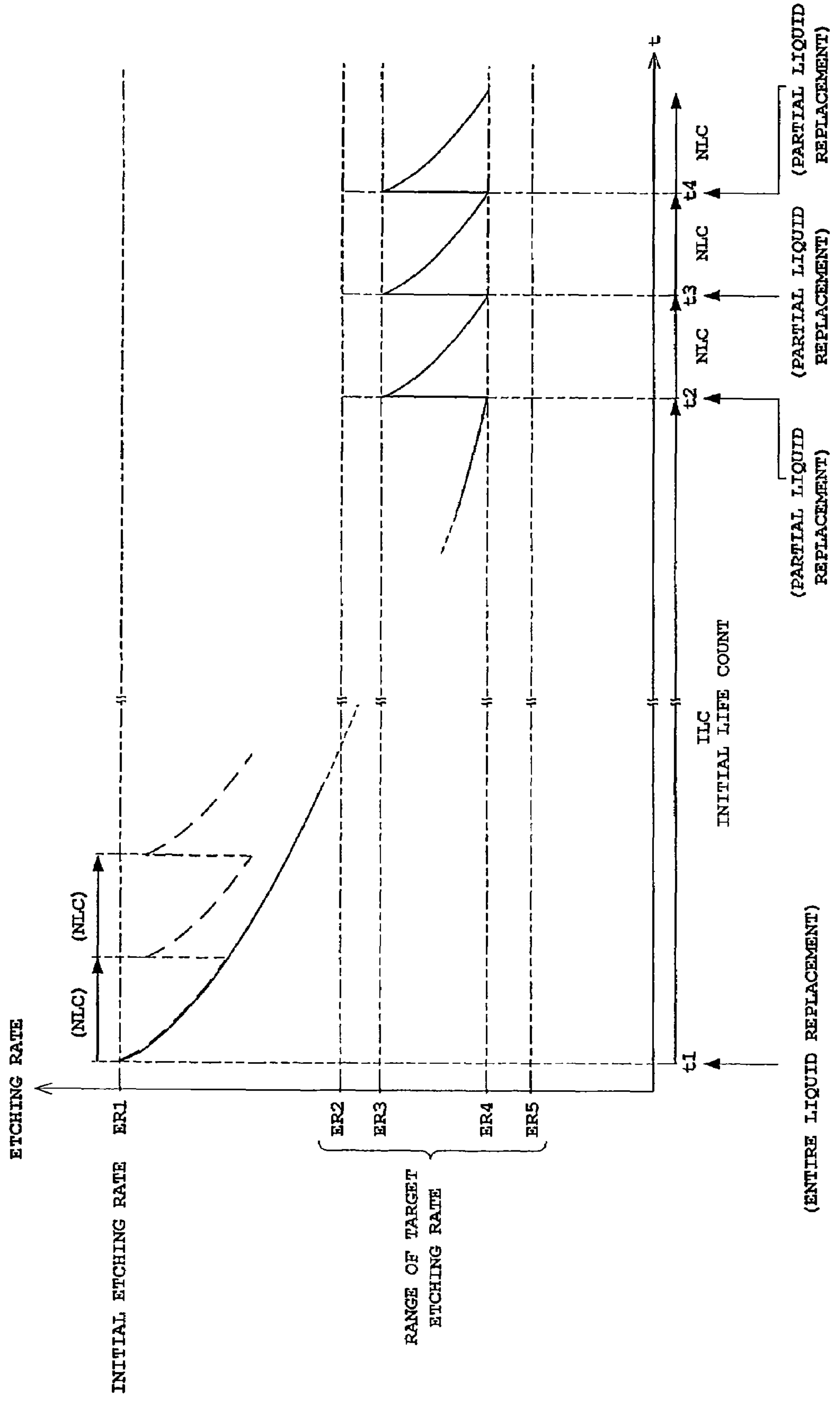
FIG. 2 is a time chart schematically showing timing of liquid replacement.

Next, the initial life count ILC and normal life count NLC will be described with reference to FIG. 2. FIG. 2 is a schematic time chart showing timing of liquid replacement.

At the beginning of treatment, or in an entire liquid replacement due to deterioration of the treating liquid, the controller 51 supplies phosphoric acid to the treating tank 1 from the supply unit 31. This timing corresponds to a time t1 in FIG. 2. The controller 51, when determining that the number of treatments from the counter 57 has reached the initial life count ILC, carries out a partial liquid replacement. Briefly, the switch valve 43 is opened to discharge a predetermined amount of the phosphoric acid solution from the treating tank 1, and the switch valve 43 is closed to supply from the supply unit 31 phosphoric acid in an amount substantially corresponding to the discharged amount of phosphoric acid. This timing corresponds to a time t2 in FIG. 2. Hereafter, the controller 51 carries out a partial liquid replacement each time the number of treatments from the counter 57 reaches the normal life count NLC (at times t3 and t4).

The initial life count ILC and normal life count NLC are determined in advance as follows.

First, wafers W are prepared which are the same type and have undergone the same treatment as wafers W to be treated by this apparatus. Then, the wafers W are set identical to actual product wafers W with respect to treatment conditions such as the number of wafers W to be treated simultaneously, the concentration and temperature of the phosphoric acid solution, and the period of time for immersing the wafers W in the phosphoric acid solution. Subsequently, the wafers W having the same treatment conditions as the actual product wafers W are treated under the identical conditions, and then a treatment rate is measured. This treatment rate is, for example, an etching rate for oxide film or nitride film. It is assumed here that a target etching rate is within a range of etching rates ER2 through ER5 in FIG. 2. After treatment of a plurality of wafers W, the number of treatments is determined at which the treatment lowers to the etching rate ER4 slightly higher than the lower limit of the target etching rates, taking a margin from the target etching rates ER2 through ER5. This number of treatments is set to the first memory 53 as the initial life count ILC. The etching rate becomes higher after each subsequent partial liquid replacement. Discharge and supply amounts of the treating liquid for the partial liquid replacement are determined so that the rate may agree with the etching rate ER3 slightly lower than the etching rate ER2 which is the upper limit of the target etching rates. After a partial liquid replacement and after the wafers W having the above conditions are treated under the identical conditions, an etching rate is measured to determine the number of treatments lowering the rate to the etching rate ER4. This number of treatments is set to the second memory 55 as the normal life count NLC.

Specifically, the initial life count ILC is, for example, 30 to 40 lots, and the normal life count NLC usually is, for example, approximately 20 lots. With the setting unit 59, the initial life count ILC and normal life count NLC can each be set to a suitable value depending on experimental results as noted above. Thus, a continuous treatment can be performed with the etching rate remaining within the target range even in the case of treatment under different conditions.

Figure 3:
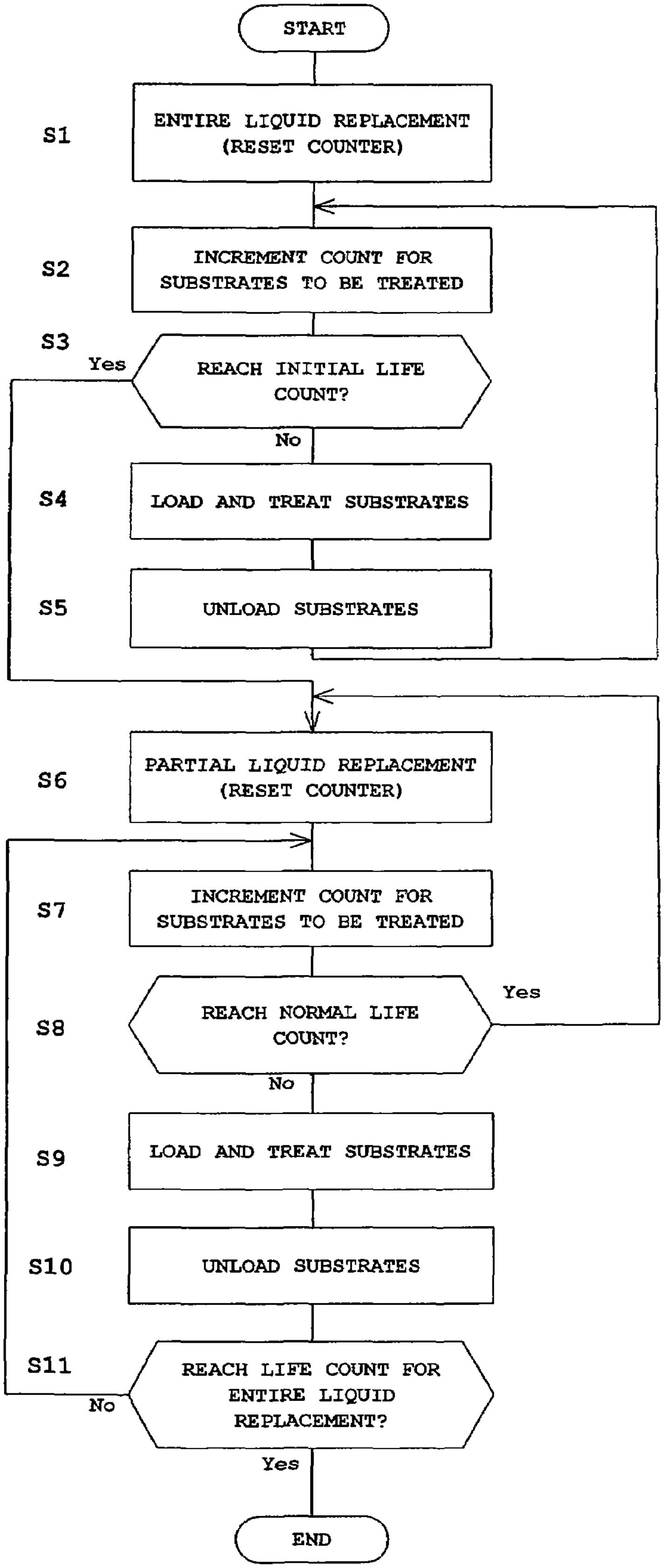
FIG. 3 is a flow chart showing operation.

Next, operation of the apparatus will be described with reference to FIG. 3. FIG. 3 is a flow chart showing operation of the apparatus. It is assumed that the treating tank 1 is empty with no phosphoric acid solution stored therein when starting the operation.

Step S1

The controller 51 operates each component to make an entire liquid replacement. Since the treating tank 1 is empty, phosphoric acid is supplied from the supply unit 31 into the inner tank 3 by opening the switch valves 21 and 23, closing the switch valves 39 and 43, and opening the control valve 29. Then, the phosphoric acid solution is generated with a required treatment condition (e.g. at a temperature of 180° C.) while circulating the phosphoric acid solution by operating the pump 15 and in-line heater 17. Moreover, the control valve 49 is opened to supply deionized water as diluent as appropriate from the deionized water supply unit 47, thereby adjusting the phosphoric acid concentration to complete initial treatment conditions. Furthermore, the counter 57 is reset to set an integrated value of the number of treatments to zero. This state corresponds to the time t1 in FIG. 2.

Steps S2 and S3

The number of treatments on the counter 57 is incremented (step S2). The operation is branched according to whether or not the number of treatments has reached the initial life count ILC (step S3). Specifically, when the number of treatments has reached the initial life count ILC, the operation proceeds to step S6 to make a partial liquid replacement. The state of having reached the initial life count ILC corresponds to the time t2 in FIG. 2. On the other hand, when the number of treatments has not reached the initial life count ILC, the operation proceeds to step S4. Here, description will be made assuming that the number of treatments has not reached the initial life count ILC. The state of not having reached the initial life count ILC corresponds to a time between t1 and t2 in FIG. 2.

Steps S4 and S5

The holding arm 7 holding wafers W is lowered to the treating position where treatment is performed for a predetermined time (step S4). After the treatment, the holding arm 7 is raised to unload the wafers W (step S5). Subsequently, the operation returns to step S2 to repeat the process.

Step S6

When the number of treatments coincides with the initial life count ILC, the controller 51 operates each component to perform a partial liquid replacement. First, the in-line heater 17 is stopped. Then, the switch valves 39 and 23 are closed, the switch valve 43 is opened, and further the switch valve 21 is opened. After that, the pump 15 is operated for a predetermined time, to discharge a predetermined amount of the phosphoric acid solution from the treating tank 1. Next, the switch valve 43 is closed, and the switch valve 23 is opened. Subsequently, the control valve 29 is opened to supply from the supply unit 27 to the inner tank 3 the amount of phosphoric acid corresponding to that of the discharged phosphoric acid solution. In addition, the pump 15 and in-line heater 17 are operated to control the phosphoric acid solution after the partial liquid replacement to the predetermined treatment conditions. The counter 57 is then reset to set the integrated value of the number of treatments to zero. This state corresponds to the time t2 in FIG. 2.

Steps S7 and S8

The number of treatments on the counter 57 is incremented (step S7). The operation is branched according to whether or not the number of treatments has reached the normal life count NLC (step S8). Specifically, when the number of treatments has reached the normal life count NLC, the operation returns to step S6 to perform a partial liquid replacement. The state of having reached the normal life count NLC corresponds to the time t3 in FIG. 2. On the other hand, when the number of treatments has not reached the normal life count NLC, the operation proceeds to step S9. Here, description will be made assuming that the number of treatments has not reached the normal life count NLC. The state of not having reached the normal life count NLC corresponds to a time between t2 and t3 in FIG. 2.

Steps S9 and S10

The holding arm 7 holding wafers W is lowered to the treating position where treatment is performed for a predetermined time (step S9). After the treatment, the holding arm 7 is raised to unload the wafers W (step S10).

Step S11

The operation is branched according to whether or not the number of treatments with the generated treating liquid has reached a total life count. The total life count is a usable maximum number of treatments equal to a sum of initial and normal life counts, and is counted with a total life counter (not shown). When the number of treatments is less than the total life count, the operation returns to step S7 to carry out a next process. When the number of treatments corresponds to the total life count, the series of processes described above is completed.

According to this embodiment, as described above, the controller 51, in controlling treatment of the wafers W, first performs an entire liquid replacement by discharging all the treating liquid from the drain pipe 41 and replenishing the treating tank 1 with a new supply of the treating liquid from the supply unit 31, and subsequently performs a partial liquid replacement upon reaching the initial life count ILC. The controller 51 thereafter performs a partial liquid replacement each time the normal life count NLC is reached. In the invention, the selective use of the initial life count ILC and normal life account NLC allows the treatment of wafers W to be carried out according to the state of the treating liquid, which can realize a proper treatment of wafers W.

Conventionally, the series of processes noted above is carried out as fixed to the normal life count NLC. Therefore, partial liquid replacements have been performed with etching rates remaining outside the range of target etching rates, as shown in dotted lines in FIG. 2, which may cause an improper treatment of wafers W.

This invention is not limited to the foregoing embodiment, but may be modified as follows:

(1) While the foregoing embodiment has been described by taking the phosphoric acid solution as an example, this invention is also applicable to treatment with a different treating liquid such as a hydrofluoric acid solution.

(2) In the foregoing embodiment, the setting unit 59 is provided for suitably setting the initial and normal life counts, but this setting unit 59 may be omitted. In this case, conditions may be set in advance according to the wafers W to be treated and treatment conditions thereof. And when installing the substrate treating apparatus, the initial life count ILC and normal life count NLC may be written into the first memory 53 and second memory 55, respectively. With this configuration, troubles due to inadvertent rewriting can be prevented and also apparatus cost can be held down.

(3) In the foregoing embodiment, treatment is performed with the circulating piping 13 for circulating the treating liquid, but a similar effect can be produced with an apparatus that performs treatment with the treating liquid remaining stored in the treating tank 1.

This invention may be embodied in other specific forms without departing from the spirit or essential attributes thereof and, accordingly, reference should be made to the appended claims, rather than to the foregoing specification, as indicating the scope of the invention.

What is claimed is:

1. A substrate treating method for performing treatment of substrates with a treating liquid, the method comprising the steps of:

performing an entire liquid replacement to supply a new supply of treating liquid into an empty treating tank;

predetermining and storing an initial life count, said initial life count being predetermined to specify an allowable number of treatments after which a treatment rate of the treating liquid falls within a target range due to treatment of the substrates after said entire liquid replacement;

automatically performing treatment of the substrates repeatedly after said entire liquid replacement until reaching said initial life count;

after reaching the initial life count, performing a partial liquid replacement, to discharge part of the treating liquid in the treating tank in a predetermined amount and to supply an amount of new treating liquid corresponding to the predetermined amount; and predetermining and storing a normal life count, said normal life count specifying an allowable number of substrate treatments with the treatment rate of the treating liquid remaining within the target range after said partial liquid replacement; and automatically performing treatment of the substrates repeatedly after said partial liquid replacement until reaching said normal life count.

2. The method according to claim 1, wherein the initial life count is set larger than the normal life count.

3. The method according to claim 2, wherein the initial life count is a number of treatments of the substrates falling within a range of target treatment rates.

4. The method according to claim 1, wherein the initial life count is a number of treatments of the substrates falling within a range of target treatment rates.

* * * * *